United States Patent
Patil et al.

(10) Patent No.: US 9,200,096 B2
(45) Date of Patent: *Dec. 1, 2015

(54) POLYVINYL ETHER BASED HIGH PERFORMANCE SYNTHETIC FLUIDS PREPARED USING CATIONIC POLYMERIZATION

(75) Inventors: Abhimanyu Onkar Patil, Westfield, NJ (US); Satish Bodige, Wayne, NJ (US); Ranjan Tripathy, Lowell, MA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 931 days.

This patent is subject to a terminal disclaimer.

(21) Appl. No.: 13/332,443

(22) Filed: Dec. 21, 2011

(65) Prior Publication Data

US 2013/0165360 A1  Jun. 27, 2013

(51) Int. Cl.

| | | |
|---|---|---|
| *C10M 107/34* | (2006.01) |
| *C08F 2/00* | (2006.01) |
| *C08F 16/12* | (2006.01) |
| *C08F 116/12* | (2006.01) |
| *C08F 216/12* | (2006.01) |
| *C08F 16/20* | (2006.01) |
| *C10M 107/24* | (2006.01) |
| *C10M 145/04* | (2006.01) |

(52) U.S. Cl.
CPC ............. *C08F 16/20* (2013.01); *C10M 107/24* (2013.01); *C10M 145/04* (2013.01); *C10M 2203/1006* (2013.01); *C10M 2203/1025* (2013.01); *C10M 2205/0285* (2013.01); *C10M 2205/173* (2013.01); *C10M 2209/04* (2013.01); *C10M 2209/043* (2013.01); *C10N 2220/021* (2013.01); *C10N 2220/022* (2013.01); *C10N 2230/02* (2013.01); *C10N 2230/70* (2013.01); *C10N 2240/04* (2013.01); *C10N 2240/08* (2013.01); *C10N 2240/10* (2013.01); *C10N 2240/102* (2013.01); *C10N 2240/104* (2013.01); *C10N 2270/00* (2013.01)

(58) Field of Classification Search
CPC .... C10M 2209/104; C08F 36/04; C08F 16/12
USPC .................................. 508/579; 526/209, 332
See application file for complete search history.

(56) References Cited

U.S. PATENT DOCUMENTS

2010/0093576 A1*  4/2010  Maruyama et al. ........... 508/370

* cited by examiner

*Primary Examiner* — Vishal Vasisth
(74) *Attorney, Agent, or Firm* — Robert A. Migliorini

(57) ABSTRACT

The synthesis of high performance polyvinyl ether (PVE) synthetic fluids using a Lewis acid based cationic polymerization process is disclosed. The polyvinyl ether fluid have repeating vinyl ether units of the general formula —[CH$_2$—CH (O—R)]$_n$, wherein R is comprised of a branched or linear alkyl group having at least 4 carbon atoms and $n$ is a whole number representing the average number of repeating units in the polyvinyl ether. The resulting PVE fluids exhibit excellent lubricant properties, similar to poly-alpha olefins (PAOs), but the PVE fluids have the benefit of higher polarity than PAOs and thus have better solubility and dispersity of polar additives.

32 Claims, No Drawings

POLYVINYL ETHER BASED HIGH PERFORMANCE SYNTHETIC FLUIDS PREPARED USING CATIONIC POLYMERIZATION

FIELD

The present disclosure relates to the synthesis of high performance polyvinyl ether (PVE) fluids using a Lewis acid based cationic polymerization process. Some of the resulting PVE fluids exhibit excellent lubricant properties, similar to poly-alpha olefins (PAOs), but the PVE fluids have the benefit of higher polarity than PAOs and thus have better solubility and dispersity of polar additives.

BACKGROUND

PAOs are a class of hydrocarbons that can be manufactured by the catalytic oligomerization (polymerization to low-molecular-weight products) of linear α-olefin (LAO) monomers. These LAO monomers typically range from 1-octene to 1-dodecene, with 1-decene being a preferred material. PAO's of different viscosity grades are typically produced by the polymerization of an alpha-olefin in the presence of a polymerization catalyst such as Friedel-Crafts catalysts. These include, for example, boron trifluoride, aluminum trichloride, or boron trifluoride promoted with water, with alcohols such as ethanol, propanol, or butanol, with carboxylic acids, with esters such as ethyl acetate or ethyl propionate, or with ethers such as diethyl ether, and diisopropyl ether. Subsequent to oligomerization, the PAO products desired to be used as lubricants are typically hydrogenated in order to reduce the residual unsaturation in the polymer, generally to a level of greater than 90% hydrogenation.

Currently, PAOs are used as basestocks in premium lubricant formulations. PAO has many advantages over conventional mineral oil or other high quality lubricants. PAOs are important lube basestocks with many excellent lubricant properties, including high viscosity index (VI) and low volatility, and are available in various viscosity ranges ($Kv_{100}$ 2-300 centiStokes (cSt). PAOs are often considered the best of the hydrocarbon-type lubricants. However, PAOs are paraffinic hydrocarbons with low polarity. This low polarity leads to low solubility and dispersancy for polar additives or sludge generated during service. To compensate for this low polarity, lubricant formulators usually add one or multiple polar co-basestocks. Esters or alkylated naphthalene (AN) are often used in PAO formulations at 1 wt. %-50 wt. % levels to increase the fluid polarity. Therefore, there is a need for a fluid exhibiting the lubricity parameters of PAO, but with built-in polarity in order to have excellent lubrication properties without the need for a co-basestock.

Methods for the preparation of polymers from vinyl alkyl ethers have been disclosed.

In U.S. Pat. No. 3,228,923 it is disclosed that polymers of vinyl alkyl ethers can be prepared using monomers comprised of ethers having the general formula $H_2CO=CH-O-R$, where R is an alkyl radical of from 1-20 carbon atoms. It is stated that lower reaction temperatures yield a higher molecular weight polymer, and that the resulting polymers are viscous oils, sticky semi-solids or hard solids. The polymers are said to be useful as adhesives, lubrication oil additives, paint and lacquer resins, molding resins, coatings, and plasticizers/modifiers for various resins and plastics. In the only example provided, the resulting polymer was said to have particular use as an adhesive, and that "when any of the other above-identified vinyl alkyl ethers are substituted for those used in the foregoing example, substantially analogous results are obtained".

In U.S. Pat. No. 5,691,430 there is disclosed a process for polymerizing a vinyl ether monomer which comprises contacting the vinyl ether with an initiator system of silicon dioxide and a one or more metallic oxides. The vinyl ethers which are useful in the disclosed process are said to be those monomers having the formula $H_2C=CH-OR$, wherein R is an alkyl cycloalkyl or alkyl substituted cycloalkyl aromatic or alkyl substituted aromatic, and R contains 1 to 20 carbon atoms. The polymerization initiator system is said to include silicon dioxide and one or more metallic oxides.

In U.S. Pat. No. 3,468,856 there is disclosed a process for the preparation of vinyl ether polymers by the polymerization of a vinyl ether in the presence of a multi-component catalyst system including (a) an organo aluminum compound of the general formula $AlXnR_3n$, wherein X represents a halogen atom, R is a member selected from alkyl cycloalkyl, aryl and aryl alkyl groups, and n is an integer of 0-2, (b) a carboxylic acid anhydride, and (c) a Friedel-Crafts halide.

In Chatterjee, P. et al., *Indian Journal of Chemistry* (1967), 5(4), 160-2, it is disclosed that octadecyl vinyl ether is cationically polymerized in a variety of solvents with anhydrous $SnCl_4$. The molecular weight-intrinsic viscosity relation for octadecyl vinyl ether polymers is said to be determined and the IR spectrum of the polymer recorded. It is also said that solvents with dielectric constants lower than that of the catalyst give better polymers compared with solvents with higher dielectric constants; the latter are said to give polymers having molecular weights <1000 or no polymerization at all.

In Kanazawa, A. et al., *Journal of Polymer Science*, Part A: Polymer Chemistry (2006), 44(19), 5795-5800, it is said that living cationic polymerization of iso-butyl vinyl ether was conducted in toluene in the presence of different Lewis acids (FeBr3, FeCl3, SnCl4, EtAlCl2) and/or in the presence of different bases (EtOAc, THF, 1,4-dioxane, and 1,3-dioxolane). Conversion, molecular weight, and polydispersity index of the resulting polymer were also said to be determined, and that basicity of base affected polymerization rate significantly. It is said that an appropriate combination of a weak Lewis base and FeCl3 realized very fast living cationic polymerization.

In JP 1993-210734, it is said that polymers with narrow molecular weight distribution (Mw/Mn) are prepared by polymerization of vinyl or propenyl ethers by using living polymerization initiators containing a three component system of (a) HX (where X is chlorine, bromine or iodine), MeCHXOR or EtCHXOR (where R is a hetero atom-substituted) alkyl), (b) $SnX_4$, $SnX_2$, $ZnX_2$, or $TiX_4$ as Lewis acids, and (c) Ra4N+BRb4- or Ra4P+BRb4- (where Ra is a primary or secondary alkyl or aralkyl, and Rb is halo or alkyl-substituted aromatic hydrocarbyl).

In U.S. Pat. No. 3,541,015, it is disclosed that ethyl vinyl ether is copolymerized with a co-monomeric compound of the formula $CH_2=CHOR$, wherein R is phenyl or alkyl of from 3 to 30 carbon atoms to give a copolymer containing from 20 to 85 weight percent of said comonomeric compound. The resulting copolymer is said to be soluble in hydrocarbon lubricating oils and exhibits a unique combination of properties such as viscosity index.

Other published articles include Kanazawa, A. et al., *Macromolecules*, 2009, 42, 3965-3972; Kanazawa, A. et al., *Chem. Lett.*, 2010, 39, 1232-1237; Sawamoto, M., *Prog. Polym. Sci.*, 1991, 16, 111-172; Aoshima, S. et al., *Macromolecules*, 1989, 22, 1010-1013; and Kishimoto, Y. et al., *Macromolecules*, 1989, 22, 3877-3882.

There is a need to provide for the synthesis of high performance polyvinyl ether synthetic fluids or basestocks using a Lewis acid-based cationic polymerization process. There is also a need to provide a new class of synthetic fluids containing a general chemical composition similar to PAO, but with built-in oxygen functionality in the form of ether functional groups. There is further a need to provide PVEs with varying polarity which can be affected by changing the alkane portion of the vinyl ether molecules. These needs and others are met through applicants' present disclosure wherein one or more vinyl ether monomers are reacted in the presence of a Lewis acid catalyst.

SUMMARY

In one of the embodiments of the present disclosure, there is provided a process for preparing polyvinyl ether fluid, the process comprising the steps of contacting one or more vinyl ether monomers with one or more Lewis acid catalysts; maintaining contact between the vinyl ether and the Lewis acid catalyst under conditions and for a time sufficient to effect a desired degree of polymerization; quenching the polymerization; and recovering the polyvinyl ether. Preferably, the process comprises using vinyl ether monomer of the general formula $CH_2=CH-O-R$ wherein R is comprised of a branched or linear alkyl group having at least 4 carbon atoms. More preferably, the process comprises using a vinyl ether monomer wherein R is comprised of a branched or linear alkyl group having between 4 and 20 carbon atoms. The process also generally comprises using Lewis acid catalyst selected from Al, B or zeolite based acids, ionic liquids, Friedel-Crafts catalysts, Friedel-Crafts catalysts with a protic promoter, synthetic or natural zeolites, acid clays, polymeric acidic resins, and silica-alumina. Preferably, the Lewis acid catalyst is selected from Friedel-Crafts catalysts, and more preferably the Lewis acid catalyst is selected from $AlCl_3$, $BF_3$, $AlBr_3$, $TiCl_3$, and $TiCl_4$.

In another embodiment of the present disclosure, there is provided a polyvinyl ether fluid comprised of repeating vinyl ether units of the general formula $-[CH_2-CH(O-R)]_n$, wherein R is comprised of a branched or linear alkyl group having at least 4 carbon atoms and n is a whole number representing the average number of repeating units in the polyvinyl ether. Preferably, the polyvinyl ether fluid has an R moiety which contains between 4 and 20 carbon atoms. More preferably, the polyvinyl ether fluid has an MWD of from 2 to 50, a VI of from 100 to 500, and a PP of from −50° C. to 20° C. Most preferably, the polyvinyl ether fluid has an MWD of from 2 to 10, a VI of from 200 to 400 and a PP of from −50° C. to 0° C.

DETAILED DESCRIPTION

All numerical values within the detailed description and the claims herein are modified by "about" or "approximately" the indicated value, and take into account experimental error and variations that would be expected by a person having ordinary skill in the art. Vinyl ethers are an important class of organic molecules with two kinds of functionalities: a reactive polymerizable vinyl double bond and polar ether group. Vinyl ethers can be prepared by the reaction of acetylene and alcohols. The vinyl ether monomers suitable for use in the present disclosure include monomers with long side chains (alkyl chain length of at least 4 or more methylene groups). For example, octadecyl vinyl ether (A), dodecyl vinyl ether (B), 2-ethylhexyl vinyl ether (C) and butyl vinyl ether (D), below, are among those which can be used.

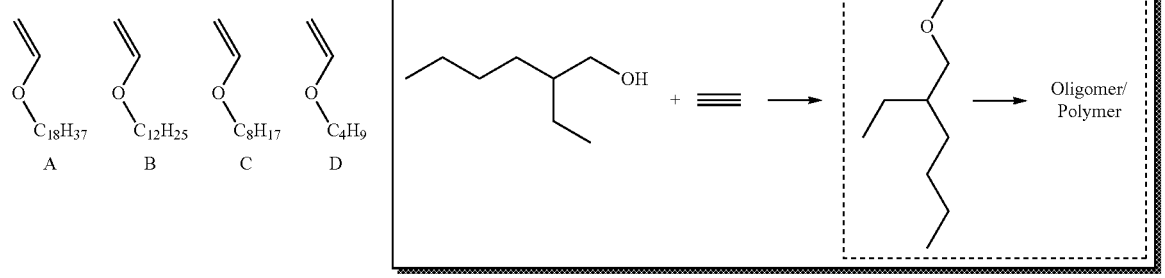

The general reaction schematic for converting these monomers to the oligomers/polymers of the present disclosure is shown below, starting with the desired vinyl alkyl ether precursors of the appropriate alcohol and acetylene. By changing the alkane portion of vinyl ether molecules by, for example, length, branching or both, PVEs with varying polarity can be synthesized. Thus, this disclosure discloses a new class of synthetic fluids having lubricating qualities similar to PAO, but with built-in oxygen functionality in the form of ether functional groups as shown in the structures below.

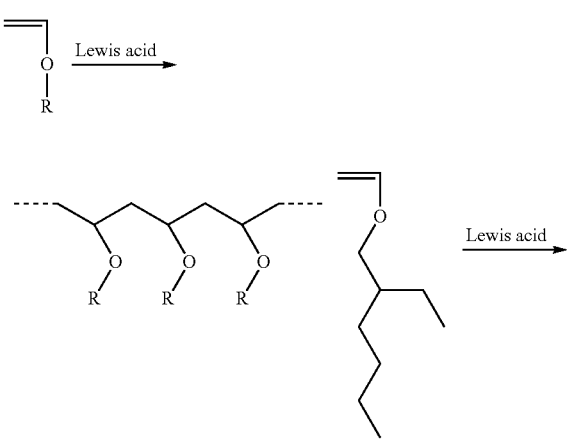

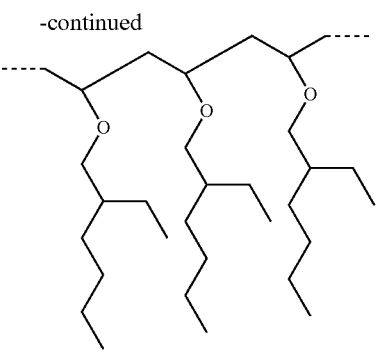

R = Alkyl group (linear or branched) of C4-C20 carbons

The vinyl ether polymerization of the present disclosure can be carried out using any acid catalyst, such as Lewis acids including Al, B or zeolite based acids, ionic liquids, etc. The Lewis acid catalysts which may be used for the present polymerization reactions include the metal and metalloid halides conventionally used as Friedel-Crafts catalysts. Suitable examples of such catalysts include $AlCl_3$, $BF_3$, $AlBr_3$, $TiCl_3$, and $TiCl_4$, either as such or with a protic promoter. Solid Lewis acid catalysts, such as synthetic or natural zeolites, acid clays, polymeric acidic resins, amorphous solid catalysts such as silica-alumina may also be used. Also useful are heteropoly acids such as the tungsten zirconates, tungsten molybdates, tungsten vanadates, phosphotungstates and molybdotungstovanadogermanates (e.g. $WOx/ZrO_2$, $WOx/MoO_3$), although these are not generally as favored economically as the metal and metalloid halides which are used in the conventional PAO polymerization processes. In general, between 0.1 to 10 wt %, and preferably between 0.2 to 3-5 wt %, of the acid catalyst is used in the polymerization process, based on total feed of the monomer.

It is possible to use solvents or diluents in the Lewis acid catalyzed polymerization step, but if the catalyst system being used is a liquid, this may also function as the solvent or diluent for the reaction so that no additional solvent or diluent is required. Additional liquids which are non-reactive to the selected catalyst system may, however, be present if desired to, for example, control viscosity of the reaction mixture or to carry off heat of reaction by evaporation with reflux of the condensed vapor. Hydrocarbons such as alkanes and aromatics (e.g. hexane or toluene) are suitable for this purpose. Thus, the vinyl ether monomer is polymerized in the presence of the catalyst system with or without the addition of solvent or diluent. The reaction will normally be carried out in a closed environment when gaseous catalysts such as boron trifluoride are used, usually under inert atmosphere (e.g. nitrogen).

The temperature of the Lewis acid-catalyzed polymerization reaction can usefully vary in practical operation between −80° C. to 300° C., preferably between −10° C. to 150° C., and more preferably between 0° C. to 75° C. The length of time of the polymerization reaction can vary widely. Reaction times of 0.5 hour up to 12-24 hours can be employed, depending upon the degree of polymerization desired. Shorter reaction times may be more desirable, and the reaction may be designed or allowed to run for 1 to 10 hours, 1 to 5 hours or any other time. The time of reaction can be selected according to need. The rate of reaction can also be controlled, as is known, by the selection of catalyst, amount of catalyst, use of promoter and the like. The reaction may be allowed to proceed under atmospheric pressure because the reaction system typically exhibits low vapor pressures at the temperatures normally used. The polymerization reaction may, however, be operated under mild pressure if it is desired to maintain a closed reaction environment (e.g. under autogenous pressure). When using a solid Lewis acid as the catalyst, the polymerization will normally be carried out using a fixed bed of the catalyst in a down flow mode, although alternative forms of operation (e.g. in a stirred tank reactor) are possible.

Following completion of the polymerization reaction, the catalyst activity may be quenched by addition of water or a dilute aqueous base such as a 5 wt % NaOH solution. The organic layer may be separated and distilled to remove components other than the PVE. When promoted $BF_3$ catalyst is used, the gaseous $BF_3$ and promoter may be recycled if not deactivated by the reaction. When a solid catalyst is used, a simple filtration is all that is needed to separate the catalyst from the PVE product if the reaction has not been carried out in a fixed bed. The PVE product may then be fractionated to remove any unreacted monomer.

The viscosity versus temperature relationship of a lubricating oil is one of the criteria which must be considered when selecting a lubricant for a particular application. Viscosity Index (VI) is an empirical, unitless number which indicates the rate of change in the viscosity of a fluid within a given temperature range. Fluids exhibiting a relatively large change in viscosity with temperature are said to have a low VI. Low VI oil, for example, will thin out at elevated temperatures faster than high VI oil. In the usual case, a higher VI oil is more desirable because it has higher viscosity at higher temperature, which translates into better or thicker lubrication film and better protection of the contacting machine elements requiring lubrication.

The PVE products have useful properties. For example, the MWD can range from 2-50, the VI can range from 100-500, and the PP can range from −50° C. or lower to 20° C. or higher. PVEs useful as lubricating basestock will generally have lower MWD, in the range of 2-10, a VI in the range of 200-400 and PP in the range of −50° C. to 0° C.

Some of these PVE molecules that have been made have PAO-like excellent lubricant properties. For example, poly (2-ethylhexyl vinyl ether) fluid has a molecular weight ($M_n$) of 3100, a molecular weight distribution (MWD) of 4.2, a kinematic viscosity at 100° C. ($Kv_{100}$) of 58.8 cSt, a viscosity index (VI) of 202.7, and a pour point (PP) of −42° C. Polydodecyl vinyl ether fluid has been found to have a $M_n$ of 16,400, a MWD of 4.9, a $Kv_{100}$ of 1360.5 cSt, a VI of 343.8, and a PP of −3° C. These molecules are suitable for use as synthetic lubricant basestock or can be used as co-basestock along with mPAO, PAO, or other lubricant basestocks.

The disclosure will now be described with reference to the following examples. These examples are for the purpose of more fully explaining to one of skill in the art the practice of the present disclosure. These examples are not limiting to the full scope of the present disclosure as explained above and as encompassed in the claims which follow.

EXAMPLES

Example 1

Polymerization of Dodecyl Vinyl Ether by Using Anhydrous $AlCl_3$ at 60° C.

1.5 g of anhydrous $AlCl_3$ and 25 g decane were charged to a 250 ml round bottom flask under $N_2$ atmosphere. 40 g of dodecyl vinyl ether and 20 g of the decane mixture were added together very slowly and the temperature maintained at 60° C. with vigorous stirring. To this reaction mixture, 0.08 g of water was added and the mixture was stirred for 3 hours at 60° C. The reaction was quenched by adding 10 ml water and 100 ml toluene. The resulting product was washed with water (4 times with 100 ml) and brine (1 time with 75 ml) until the aqueous layer reaches a pH~7. The resulting product was dried and filtered. Purification was performed by re-precipitation in hexane/MeOH. The low boiling components (toluene, hexane and methanol) were removed by rotovapory and high boiling components (dodecyl vinyl ether) were removed by air bath in an oven at 160-170° C. under high vacuum. The product was characterized by IR and GPC. Yields: 28 g (70%). IR (cm$^{-1}$): 2924, 2853, 1486, 1377, 1098, 721. GPC: $M_w$: 79000, $M_n$: 16300, MWD: 4.8 (polystyrene standard).

Lubricating Properties of the Obtained Basestock

The kinematic viscosity (Kv) of the liquid product was measured using ASTM standards D-445 and reported at temperatures of 100° C. (Kv at 100° C.) and 40° C. (Kv at 40° C.). The viscosity index (VI) was measured according to ASTM standard D-2270 using the measured kinematic viscosities. The viscosity of the product at 100° C. was 1360.46 cSt and at 40° C. was 13921.83 cSt, giving a viscosity index (VI) of 343.77. The viscometric data suggest that the fluid has good lubricant properties. The data compare well with PAO 1000 (a poly(alpha olefin) made from 1-decene and having a $Kv_{100}$ of approximately 1000) as shown below in Table 1.

TABLE 1

The Properties of the Basestocks

| Sample # | Kinematic viscosity $Kv_{100}$ | Kinematic viscosity $Kv_{40}$ | Viscosity Index (VI) | Pour Point (° C.) |
|---|---|---|---|---|
| Example 1 | 1360.5 | 13921.8 | 343.8 | −3 |
| PAO1000 | 1000 | 10,000 | 307 | −18 |

Example 2

Polymerization of 2-Ethylhexyl Vinyl Ether by Using Anhydrous $AlCl_3$ at 60° C.

1.5 g of anhydrous $AlCl_3$ and 30 g decane were charged to a 350 ml round bottom flask under $N_2$ atmosphere. 30 g of 2-ethylhexyl vinyl ether and 20 g of decane mixture were added together very slowly and the temperature maintained at 60° C. with vigorous starring. To this reaction mixture, 0.06 g of water was added and the mixture was stirred for 3 hours at 60° C. The reaction was quenched by adding 10 ml water and 100 ml hexane. The product was washed with water (3 times with 100 ml) and brine (1 time with 100 ml) until the aqueous layer reached a pH~7. The resulting product was dried and filtered. Purification was performed by re-precipitation in hexane/MeOH. The low boiling (hexane and methanol) components were removed by rotovapory and the high boiling component (2-ethylhexyl vinyl ether) was removed by air bath in an oven at 160-170° C. under high vacuum. The product was characterized by IR and GPC. Yield: 21 g (70%). IR (cm$^{-1}$): 2959, 2630, 1461, 1378, 1087, 772. GPC: $M_w$: 13000, $M_n$: 3100, MWD: 4.2 (polystyrene standard).

Lubricating Properties of the Obtained Basestock

The kinematic viscosity (Kv) of the liquid product was measured using ASTM standards D-445 and reported at temperatures of 100° C. (Kv at 100° C.) and 40° C. (Kv at 40° C.). The viscosity index (VI) was measured according to ASTM standard D-2270 using the measured kinematic viscosities for the product. The viscosity of the product at 100° C. was 58.76 cSt and at 40° C. was 446.3 cSt, giving a viscosity index (VI) of 202.8. The viscometric data suggest that the fluid has good lubricant properties. The data compare well with PAO 40 (a poly(alpha olefin) made from 1-decene and having a $Kv_{100}$ of approximately 40) as shown below in Table 2.

TABLE 2

The Properties of Basestocks

| Sample # | Kinematic viscosity $Kv_{100}$ | Kinematic viscosity $Kv_{40}$ | Viscosity Index (VI) | Pour Point (° C.) |
|---|---|---|---|---|
| Example 2 | 58.8 | 446.3 | 202.7 | −42 |
| PAO 40 | 39 | 396 | 147 | −30 |

Example 3

Polymerization of 2-Ethylhexyl Vinyl Ether by Using Anhydrous $AlCl_3$ at 0-3° C.

1.0 g of anhydrous $AlCl_3$ and 25 g decane were charged to a 350 ml round bottom flask under $N_2$ atmosphere. 10 g of 2-ethylhexyl vinyl ether and 10 g of decane mixture were added together very slowly and the temperature maintained at 0-3° C. with vigorous stirring. To this reaction mixture, 0.04 g of water was added and the mixture was stirred for 2 hours at 0-3° C. The reaction was quenched by adding 10 ml water and 100 ml hexane. The product was washed with water (3 times with 100 ml) and brine (1 time with 100 ml) until the aqueous layer reached a pH~7. The resulting product was dried and filtered. Purification was performed by re-precipitation in hexane/MeOH. The low boiling components (hexane and methanol) were removed by rotovapory and the high boiling component (2-ethylhexyl vinyl ether) was removed by air bath in an oven at 160-170° C. under high vacuum. The high viscous rubbery product was characterized by IR and GPC. Yield: 7 g (70%). IR (cm$^{-1}$): 2958, 2858, 1462, 1236, 1086, 816, 771, 728. GPC: $M_w$: 150,000, $M_n$: 13,300, MWD: 11.3.

Example 4

Polymerization of Butyl Ether by Using Anhydrous $AlCl_3$ at 60° C.

2.0 g of anhydrous $AlCl_3$ and 30 g decane were charged to a 350 ml round bottom flask under $N_2$ atmosphere. 40 g of butyl vinyl ether and 20 g of the decane mixture were added together very slowly and the temperature maintained at 60° C. with vigorous stirring. To this reaction mixture, 0.08 g of water was added and the resulting mixture was stirred for 3 hours at 60° C. The reaction was quenched by adding 10 ml water and 100 ml hexane. The product was washed with water (3 times with 100 ml) and brine (1 time with 100 ml) until the aqueous layer reached a pH~7. The resulting product was dried and filtered. Purification was performed by re-precipitation in hexane/MeOH. The low boiling (hexane and methanol) components were removed by rotovapory and the high boiling component (butyl vinyl ether) was removed by air bath in an oven at 160-170° C. under high vacuum. The high viscous rubbery product was characterized by IR and GPC. Yield: 35 g (87%). IR (cm$^{-1}$): 2957, 2931, 1458, 1377, 1230, 1092, 1039, 802, 737. GPC: $M_w$: 348,000, $M_n$: 9900, MWD: 35.2.

All of these polymers were soluble in mPAOs, PAOs, Group I-III basestocks, GTL and Visom (Gr. III) basestocks. All the mentioned basestocks are well known to those skilled in the art. The PVE fluids of the present disclosure, as such, or their blends or as co-basestocks with other lubricants can be used as lube basestocks. These synthetic fluids can be used in finished lubricant formulation to provide energy efficiency in automotive engine lubricants, in industrial or drive-line lubricants, in gas engine or marine lubricants.

In addition to the above-mentioned vinyl ethers, other vinyl ethers may be used as a monomer or as co-monomer with other vinyl ethers containing different alkyl groups. Thus, these would yield copolymers of vinyl ethers. Vinyl ethers can also be copolymerized with alpha-olefins such as 1-decene, 1-octene, 1-dedecene and the like to make copolymers of vinyl ethers and alpha-olefins.

PCT and EP Clauses:

1. A composition comprising one or more compounds containing repeating units of the general formula $-[CH_2-CH(O-R)]_n$ wherein R is comprised of a branched or linear alkyl group having at least 4 carbon atoms and $n$ is a whole number representing the average number of repeating units in the polyvinyl ether, wherein said composition has a viscosity ($Kv_{100}$)≥2 and a viscosity index (VI)≥100.

2. The composition of clause 1 wherein R is between 4 and 20.

3. The composition of clauses 1-2 wherein the $Kv_{100}$ is between 20 and 2000.

4. The composition of clauses 1-3 wherein the VI is between 100 and 500.

5. The composition of clauses 1-4 having a molecular weight distribution (MWD) between 2 and 50.

6. The composition of clauses 1-5 wherein the pour point (PP) is between −50° C. and 20° C.

7. A composition comprising one or more compounds containing repeating vinyl ether units of the general formula $-[CH_2-CH(O-R)]_n$ wherein R is comprised of a branched or linear alkyl group having at least 4 carbon atoms and $n$ is a whole number representing the average number of repeating units in the polyvinyl ether, wherein said composition is produced by reacting a vinyl ether monomer (R≥4) or combinations thereof in the presence of a Lewis acid catalyst under conditions and for a time sufficient to produce said composition.

8. The composition of clause 7 wherein said composition has a viscosity ($Kv_{100}$)≥2, a viscosity index (VI)≥100, a molecular weight distribution (MWD) between 2 and 50 and a pour point (PP) of ≤30° C.

9. A lubricating oil base stock comprising one or more compounds represented by the general formula $-[CH_2-CH(O-R)]_n$, wherein R is comprised of a branched or linear alkyl group having at least 4 carbon atoms and $n$ is a whole number representing the average number of repeating units, and wherein said composition has a viscosity ($Kv_{100}$)≥2, a viscosity index (VI)≥100, a molecular weight distribution (MWD) between 2 and 50, and a pour point (PP) of ≤30° C.

10. A lubricating oil comprising a lubricating oil base stock as a major component, and one or more compounds represented by the general formula $-[CH_2-CH(O-R)]_n$, wherein R is comprised of a branched or linear alkyl group having at least 4 carbon atoms and $n$ is a whole number representing the average number of repeating units, and wherein said composition has a viscosity ($Kv_{100}$)≥2, a viscosity index (VI)≥100, a molecular weight distribution (MWD) between 2 and 50, and a pour point (PP) of ≤30° C.

11. The lubricating oil of clause 10 wherein the lubricating oil base stock comprises a Group I, II, III, IV or V base oil stock.

12. The lubricating oil of clauses 10-11 wherein the lubricating oil base stock comprises a polyalphaolefin (PAO) or gas-to-liquid (GTL) oil base stock.

13. The lubricating oil of clauses 10-12 wherein the lubricating oil base stock is present in an amount from 50 weight percent to 99 weight percent, and the one or more compounds represented by the general formula $-[CH_2-CH(O-R)]_n$ is present in an amount from 1 weight percent to 50 weight percent, based on the total weight of the lubricating oil.

14. The lubricating oil of clauses 10-13 wherein the lubricating oil further comprises one or more of a viscosity improver, antioxidant, detergent, dispersant, pour point depressant, corrosion inhibitor, metal deactivator, seal compatibility additive, anti-foam agent, inhibitor, or antirust additive.

15. The lubricating oil of clauses 10-14 which is passenger vehicle engine oil.

16. A process for preparing a composition comprising polyvinyl ether, said process comprising:
   a. contacting one or more vinyl ether monomers or oligomers of the general formula $CH_2=CH-O-R$, wherein R is comprised of a branched or linear alkyl group having at least 4 carbon atoms, with one or more Lewis acid catalysts; and
   b. maintaining contact between the vinyl ether and the Lewis acid catalyst under conditions and for a time sufficient to produce said composition.

17. The process of clause 16 wherein R is comprised of a branched or linear alkyl group having between 4 and 20 carbon atoms.

18. The process of clauses 16-17 wherein at least two different vinyl ethers are used.

19. The process of clauses 16-18 wherein the Lewis acid catalyst is selected from Al, B or zeolite based acids, ionic liquids, Friedel-Crafts catalysts, Friedel-Crafts catalysts with a protic promoter, synthetic or natural zeolites, acid clays, polymeric acidic resins, and silica-alumina.

20. The process of clause 19 wherein the Lewis acid catalyst is selected from $AlCl_3$, $BF_3$, $AlBr_3$, $TiCl_3$, and $TiCl_4$.

21. The process of clauses 19-20 wherein the Lewis acid catalyst is present from 0.1 to 10 wt % based on total feed of vinyl ether.

22. The process of clauses 16-21, wherein the conditions comprise a temperature of between −80° C. and 300° C. and the time is between 0.5 hours and 10 hours.

23. The process of clauses 16-22, further comprising the step of quenching the reaction and the quenching is performed by addition of water or a dilute aqueous base.

24. The process of clauses 16-23 further comprising the use of a solvent or diluent in step a.

25. The process of clause 24 wherein the solvent or diluent is selected from one or more alkanes, one or more aromatics and combinations thereof.

26. The process of clauses 24-25 wherein the solvent or diluent is selected from hexane and toluene.

27. A method for improving one or more of solubility and dispersancy of polar additives in a lubricating oil by using as the lubricating oil a formulated oil comprising a lubricating oil base stock as a major component, and one or more compounds represented by the general formula $-[CH_2-CH(O-R)]_n$, wherein R is comprised of a branched or linear alkyl group having at least 4 carbon atoms and $n$ is a whole number representing the average number of repeating units, and wherein said composition has a viscosity ($Kv_{100}$)≥2, a viscosity index (VI)≥100, a molecular weight distribution (MWD) between 2 and 50, and a pour point (PP) of ≤30° C.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

While several embodiments in accordance with the disclosure have been shown and described, it is to be clearly understood that the same may be susceptible to numerous changes apparent to one skilled in the art. Therefore, the disclosure is not limited to the details shown and described but is intended to show all changes and modifications that come within the scope of the appended claims.

All of the patents and publications mentioned herein are incorporated by reference into this application, as if fully set forth herein, for all that such patents and publications contain in their written disclosures.

What is claimed is:

1. A composition comprising one or more compounds consisting essentially of repeating units of the general formula —[CH$_2$—CH (O—R)]$_n$, wherein R is comprised of a branched or linear alkyl group having at least 4 carbon atoms and $n$ is a whole number representing the average number of repeating units in the polyvinyl ether, wherein said composition has a viscosity (Kv$_{100}$)≥2 and a viscosity index (VI)≥100.

2. A composition according to claim 1, wherein R is between 4 and 20.

3. A composition according to claim 1, wherein the Kv$_{100}$ is between 20 and 2000.

4. A composition according to claim 1, wherein the VI is between 100 and 500.

5. A composition according to claim 4, wherein the VI is between 200 and 400.

6. A composition according to claim 1, having a molecular weight distribution (MWD) between 2 and 50.

7. A composition according to claim 6, wherein the MWD is between 2 and 10.

8. A composition according to claim 1, having a pour point (PP)≤30° C.

9. A composition according to claim 8, wherein the pour point (PP) is between −50° C. and 20° C.

10. A composition according to claim 9, wherein the pour point (PP) is between −50° C. and 0° C.

11. A composition comprising one or more compounds consisting essentially of repeating vinyl ether units of the general formula —[CH2-CH (O—R)]n, wherein R is comprised of a branched or linear alkyl group having at least 4 carbon atoms and n is a whole number representing the average number of repeating units in the polyvinyl ether, wherein said composition is produced by reacting a vinyl ether monomer (R≥4) or combinations thereof in the presence of a Lewis acid catalyst under conditions and for a time sufficient to produce said composition.

12. A composition according to claim 11, wherein said composition has a viscosity (Kv100)≥2, a viscosity index (VI)≥100, a molecular weight distribution (MWD) between 2 and 50 and a pour point (PP) of ≤30° C.

13. A lubricating oil base stock comprising one or more compounds consisting essentially of repeating vinyl ether units of the general formula —[CH2-CH (O—R)]n, wherein R is comprised of a branched or linear alkyl group having at least 4 carbon atoms and n is a whole number representing the average number of repeating units, and wherein said composition has a viscosity (Kv100)≥2, a viscosity index (VI)≥100, a molecular weight distribution (MWD) between 2 and 50, and a pour point (PP) of ≤30° C.

14. A lubricating oil comprising a lubricating oil base stock as a major component, and one or more compounds consisting essentially of repeating vinyl ether units of the general formula —[CH2-CH (O—R)]n, wherein R is comprised of a branched or linear alkyl group having at least 4 carbon atoms and $n$ is a whole number representing the average number of repeating units, and wherein said composition has a viscosity (Kv$_{100}$)≥2, a viscosity index (VI)≥100, a molecular weight distribution (MWD) between 2 and 50, and a pour point (PP) of ≤30° C.

15. The lubricating oil of claim 14, wherein the lubricating oil base stock comprises a Group I, II, III, IV or V base oil stock.

16. The lubricating oil of claim 15, wherein the lubricating oil base stock comprises a polyalphaolefin (PAO) or gas-to-liquid (GTL) oil base stock.

17. The lubricating oil of claim 14, wherein the lubricating oil base stock is present in an amount from 50 weight percent to 99 weight percent, and the one or more compounds represented by the general formula —[CH2-CH (O—R)]n are present in an amount from 1 weight percent to 50 weight percent, based on the total weight of the lubricating oil.

18. The lubricating oil of claim 14, wherein the lubricating oil further comprises one or more of a viscosity improver, antioxidant, detergent, dispersant, pour point depressant, corrosion inhibitor, metal deactivator, seal compatibility additive, anti-foam agent, inhibitor, or antirust additive.

19. The lubricating oil of claim 18 which is passenger vehicle engine oil.

20. A process for preparing a composition comprising polyvinyl ether, said process comprising:
  a. contacting one or more vinyl ether monomers or oligomers of the general formula CH2=CH—O—R, wherein R is comprised of a branched or linear alkyl group having at least 4 carbon atoms, with one or more Lewis acid catalysts; and
  b. maintaining contact between the vinyl ether and the Lewis acid catalyst under conditions and for a time sufficient to produce said composition,
    wherein the composition consists essentially of one or more compounds containing repeating units of the general formula —[CH$_2$—CH (O—R)]$_n$, wherein R is comprised of a branched or linear alkyl group having at least 4 carbon atoms and $n$ is a whole number representing the average number of repeating units in the polyvinyl ether, wherein said composition has a viscosity (Kv$_{100}$)≥2 and a viscosity index (VI)≥100.

21. A process according to claim 20, wherein R is comprised of a branched or linear alkyl group having between 4 and 20 carbon atoms.

22. A process according to claim 20, wherein at least two different vinyl ethers are used.

23. A process according to claim 20, wherein the Lewis acid catalyst is selected from Al, B or zeolite based acids, ionic liquids, Friedel-Crafts catalysts, Friedel-Crafts catalysts with a protic promoter, synthetic or natural zeolites, acid clays, polymeric acidic resins, and silica-alumina.

24. A process according to claim 23, wherein the Lewis acid catalyst is selected from Friedel-Crafts catalysts.

25. A process according to claim 24, wherein the Lewis acid catalyst is selected from AlCl3, BF3, AlBr3, TiCl3, and TiCl4.

26. A process according to claim 20, wherein the Lewis acid catalyst is present from 0.1 to 10 wt % based on total feed of vinyl ether.

27. A process according to claim 20, wherein the conditions comprise a temperature of between −80° C. and 300° C. and the time is between 0.5 hours and 10 hours.

28. A process according to claim 20, further comprising the step of quenching the reaction and the quenching is performed by addition of water or a dilute aqueous base.

29. A process according to claim 20, further comprising the use of a solvent or diluent in step a.

30. A process according to claim 29, wherein the solvent or diluent is selected from one or more alkanes, one or more aromatics and combinations thereof.

31. A process according to claim 30, wherein the solvent or diluent is selected from hexane and toluene.

32. A method for improving one or more of solubility and dispersancy of polar additives in a lubricating oil by using as the lubricating oil a formulated oil comprising a lubricating oil base stock as a major component, and one or more compounds consisting essentially of repeating vinyl ether units of the general formula —[CH2-CH (O—R)]n, wherein R is comprised of a branched or linear alkyl group having at least 4 carbon atoms and n is a whole number representing the average number of repeating units, and wherein said composition has a viscosity (Kv100)≥2, a viscosity index (VI)≥100, a molecular weight distribution (MWD) between 2 and 50, and a pour point (PP) of ≤30° C.

* * * * *